Nov. 6, 1928.
M. W. P. McNAMARA
1,690,744
FISH PLATE
Filed Aug. 5, 1927
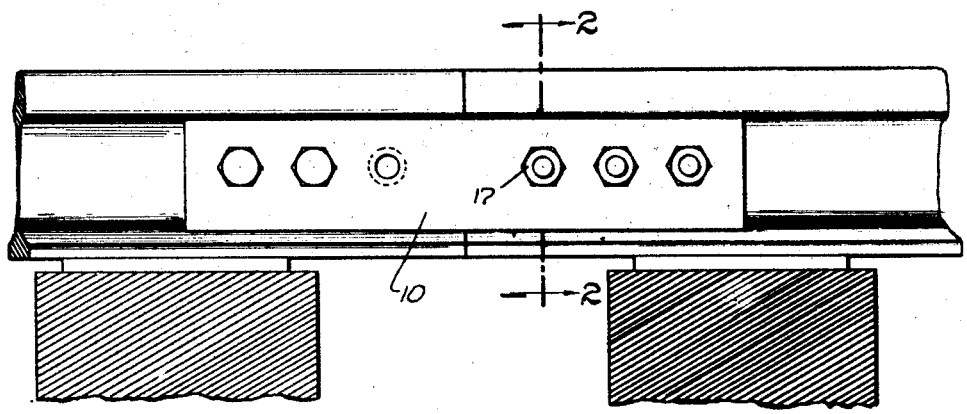
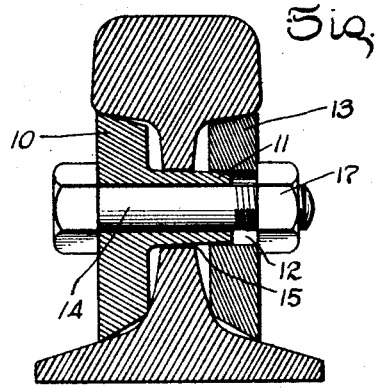
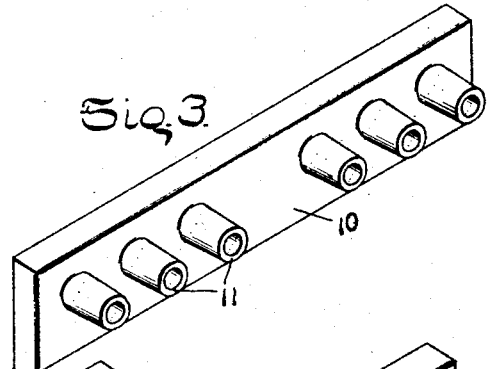
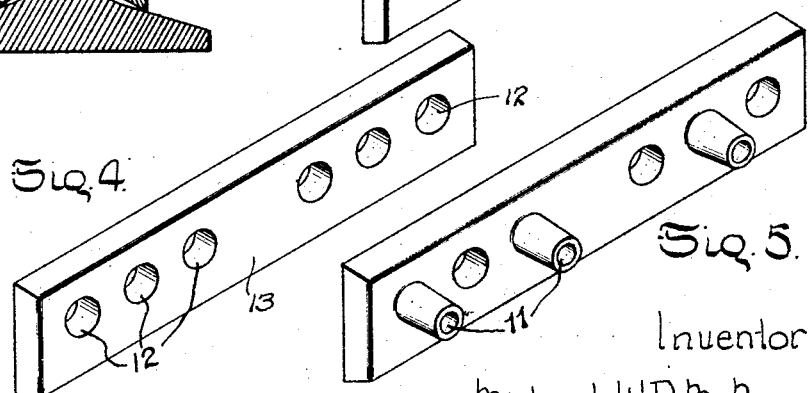
Witnesses
S. J. Collins
F. C. Appleton
Inventor
Michael W. P. McNamara
By Joshua R H Potk
his Attorney Patented Nov. 6, 1928.

1,690,744

UNITED STATES PATENT OFFICE.

MICHAEL W. P. McNAMARA, OF CHICAGO, ILLINOIS.

FISHPLATE.

Application filed August 5, 1927. Serial No. 210,741.

My invention relates to improvements in means for joining and connecting rails and has for its object the provision of a device of the character described, whereby a more rigid joining of rails may be obtained.

Another object of my invention is to provide an improved fish plate connection between rails such as is used in railroad and similar construction.

Other objects and advantages of my invention will appear more fully in the hereinafter specification when taken in connection with the accompanying drawing in which:—

Figure 1 is a side elevation of my invention as applied to rails.

Figure 2 is a cross section taken on line 2—2 of Figure 1.

Figure 3 is a perspective view of the male fish plate member.

Figure 4 is a perspective view of the female fish plate member.

Figure 5 is a perspective view of a modified form of my invention in which the male and female members are combined into one unit adapted to co-act with a corresponding member.

Referring more particularly to the drawing in which similar figures of reference applied to like parts in the several figures 10 designate a male fish plate member having perforated bosses 11 adapted to be received by apertures 12 in a female fish plate member 13,—the male member being applied upon one side of the ends of a pair of rails and the female member being applied to the other side of the rails,—a rigid joining then being effected by rail bolts 14 which are passed through the perforated bosses 11, the holes 15 of the rails and then into the holes 12 of the female member. Nuts 17 are then screw-threaded on the bolts whereby the male and female fish plates and consequently the rails, are rigidly joined.

In the modification shown in Figure 3, bosses and perforations are provided on a combination fish plate,—the mode of application being obvious, the bosses being adapted to register with the holes on the corresponding plate on the opposite side of the track, —bolts are then inserted through the combination plates and the track therebetween and drawn into position with nuts.

By my novel type of fish plates, I have been able to effect a more rigid junction of rails as used in street car or railroad service. The bosses, if desired, can be slightly tapered, sufficiently to obtain a wedging effect at the point of application to the rail. As is obvious from an inspection of the plates, their application to the rail is an elementary operation and requires no more time and labor than that given to the putting on of the conventional fish plate.

It will be understood that my invention is susceptible of some modification and change and, hence, I do not confine myself to the precise embodiment as set forth, but desire to avail myself of such changes and modifications as lie within the scope of the appended claims.

What I claim as new and desire to secure by Letters Patent is:—

1. A fish plate comprising a male member having a plurality of bolt receiving tapered bosses; said bosses being adapted to enter registering holes in the web of a rail, and a female fish plate member adapted to co-act with said male fish plate member in connecting in a wedging manner a plurality of rails together.

2. A male fish plate member having a plurality of integral bolt receiving tapered bosses; said male fish plate member being adapted to register and co-act wedgingly with a female fish plate member.

3. A combined male and female fish plate, having a plurality of bolt receiving tapered bosses at one end of the web, and a plurality of perforations at the other end of the web; said bosses and perforations being adapted to register in a wedging manner with perforations and bosses on a similar plate.

4. In apparatus for joining rails together; a male member having a plurality of integrally formed perforated tapered bosses on the side wall thereof, a co-acting female fish plate member having a plurality of perforations adapted to receive said bosses, said male and female fish plate members serving to rigidly join rails together when clamped by bolts passed through said tapered bosses, the bolts being fastened in place by nuts.

5. A device for joining rails together a male fish plate comprising a plate having a plurality of spaced perforated tapered bosses, a female fish plate having a plurality of spaced boss receiving perforations, said bosses and perforations being adapted to receive bolts passed therethrough whereby rails may be joined together.

In testimony whereof I have signed my name to this specification.

MICHAEL W. P. McNAMARA.